Jan. 17, 1961  A. R. KILMINSTER  2,968,214
MODIFICATION OF THE LIGHT RESPONSE FROM A COLOURED ORIGINAL
Filed Nov. 4, 1955  6 Sheets-Sheet 1
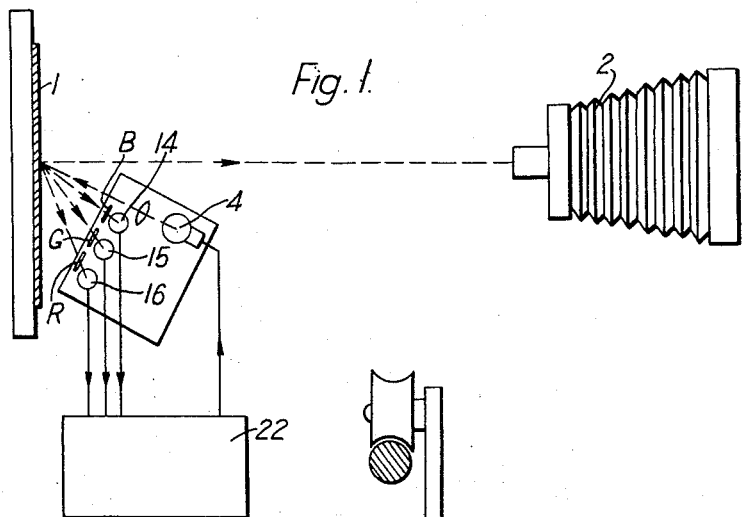
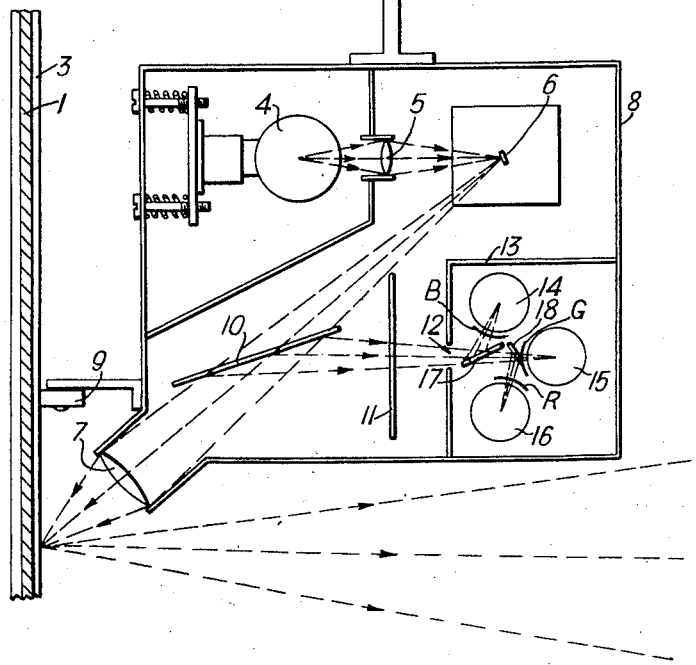
Inventor
ARTHUR R. KILMINSTER
By

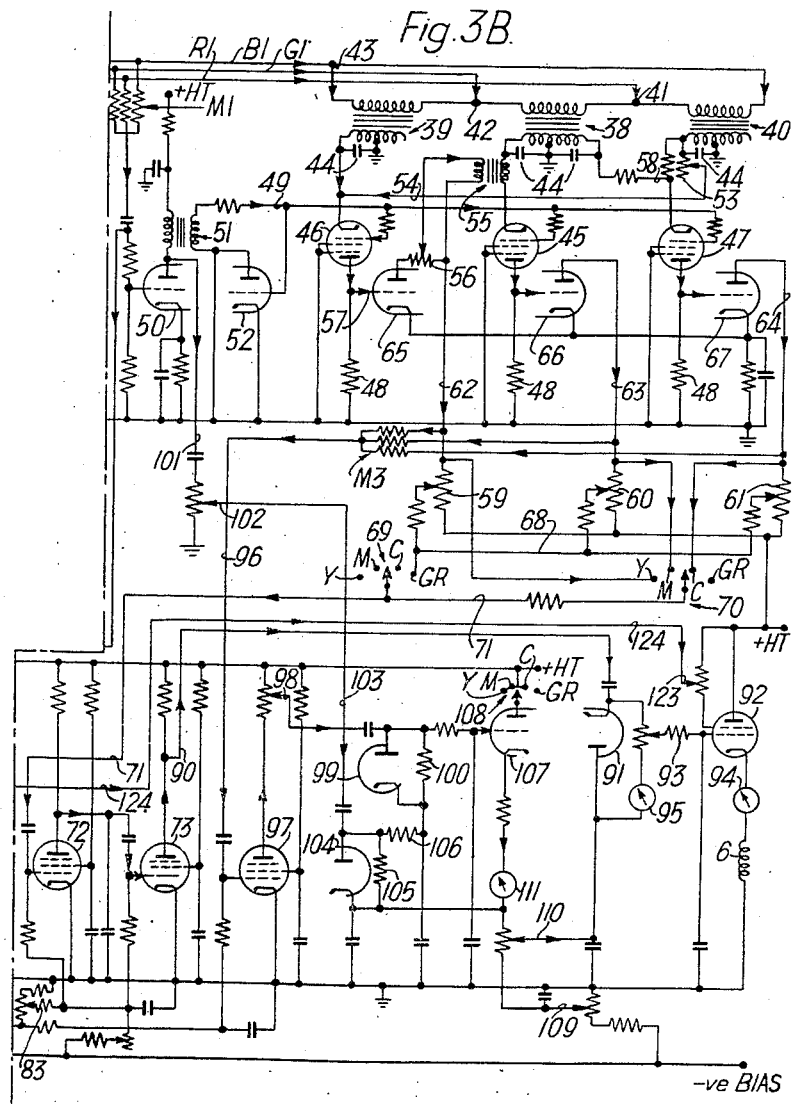

Inventor
ARTHUR R. KILMINSTER
By

Jan. 17, 1961 A. R. KILMINSTER 2,968,214
MODIFICATION OF THE LIGHT RESPONSE FROM A COLOURED ORIGINAL
Filed Nov. 4, 1955 6 Sheets-Sheet 5
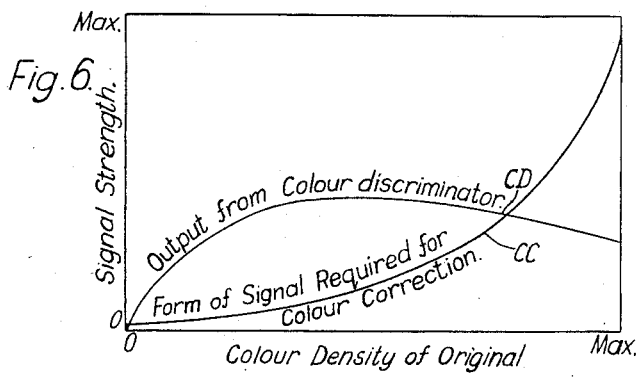
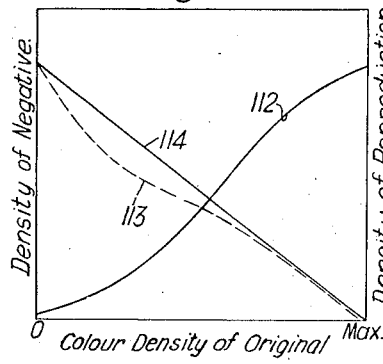
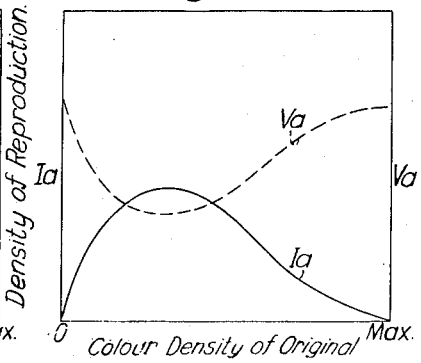
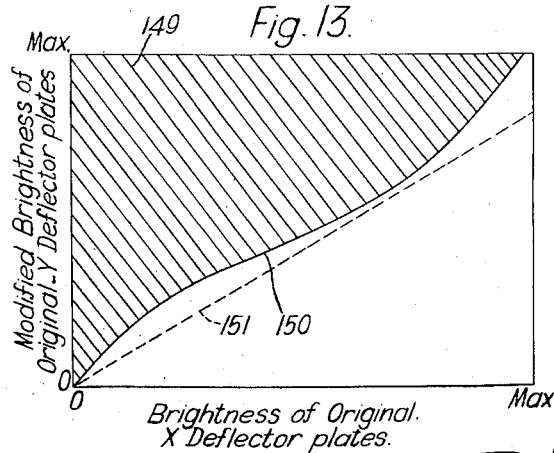
Inventor
ARTHUR R. KILMINSTER
By

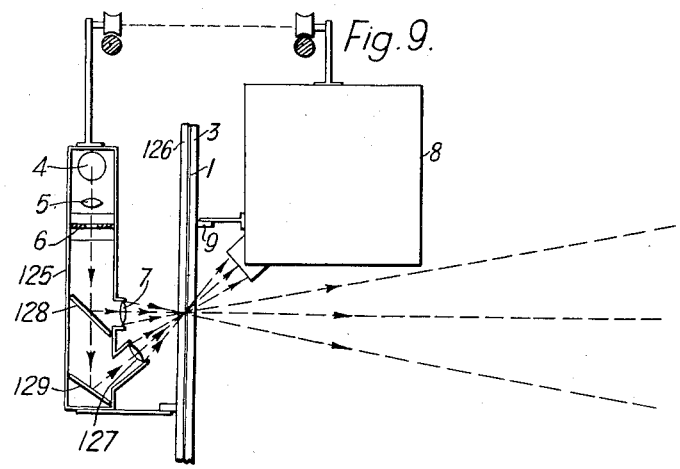
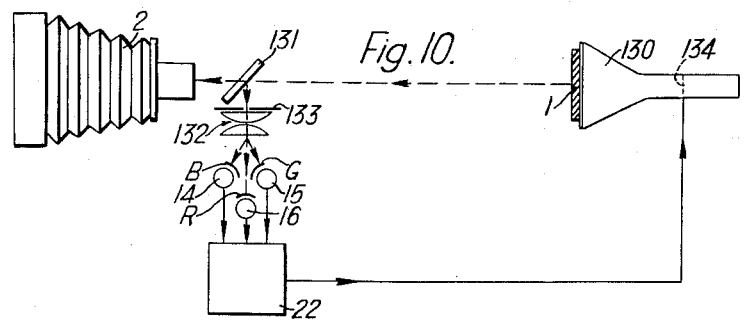
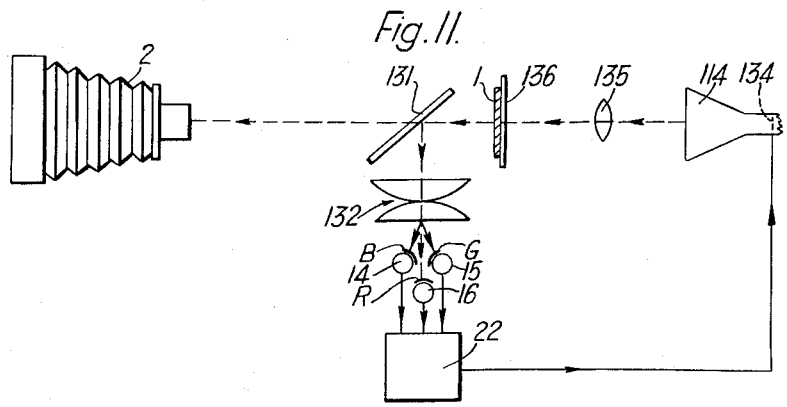
Inventor
ARTHUR R. KILMINSTER
By

United States Patent Office 2,968,214
Patented Jan. 17, 1961

2,968,214

MODIFICATION OF THE LIGHT RESPONSE FROM A COLOURED ORIGINAL

Arthur Roy Kilminster, Birmingham, England, assignor to Hunter-Penrose Limited, London, England, a British company Filed Nov. 4, 1955, Ser. No. 545,100

Claims priority, application Great Britain Nov. 18, 1954

14 Claims. (Cl. 88—24)

This invention relates to the modification of the light response from a coloured original thereby, for example, to facilitate the production of colour, or of colour and tone, corrected colour separation photographic negatives, for example for use in photo-mechanical reproduction processes.

As is well understood in the art of photo-mechanical reproduction there are a number of factors which combine to render essential extensive retouching of negatives for use in photographic reproducing processes and such retouching consumes a large part of the time involved in the production of printing plates and necessitates the use of skilled operatives. The cost of retouching of negatives accordingly represents a large part of the expense incurred in photo-mechanical reproduction processes.

In photo-mechanical reproduction processes three-colour printing is effected by the use of yellow, cyan, and magenta inks, and if four-colour printing is to be effected the fourth coloured ink is black. It is well understood, however, that the colour of none of the inks so used conforms to the theoretical ideal therefor. Further, some colours will not transmit sufficient light to permit the production of an adequately dense negative from which can be produced a printing plate which, when using the above mentioned inks, will give the desired fidelity of reproduction. These and other factors well understood in the art combine to result in distorted reproduction of relative tone values and it is an object of the invention to provide means whereby the apparent density of an original can be automatically modified during the photographing thereof thereby to permit the production of negatives which are colour or colour and tone corrected having regard to such factors so reducing to a minimum the need for retouching.

In the description which follows the invention will be described in connection with the application thereof to the direct exposure of an original on a photographic plate but it is to be understood that the use of the invention is not confined to this application thereof as it can be used for any purpose in which it is desired automatically to control the light response from a coloured original irrespective of the form of the "original." For example, the apparatus can be used in conjunction with the production of photographic plates remote from the position of the original as by telegraph or radio in which instance the light response from the original will be employed to produce the signals for said telegraph or radio transmission.

According to the present invention apparatus for modifying the light response from a coloured original, comprises scanning means operative to direct a spot of substantially white light on to a coloured original and to effect sequential scanning of the original, electrically actuated modulating means operable to vary the intensity of said scanning spot, and control means activated by the primary colour components of light transmitted from the original as the result of the application of the scanning spot thereto to produce therefrom an electric colour correction signal or an electric colour and tone correction signal to effect actuation of said modulating means thereby to modify the light response from the original.

Further according to the invention a method of producing colour separation negatives for use in photo-mechanical reproducing processes comprises the steps of sequentially scanning a coloured original by a small spot of substantially white light, exposing a colour separation photographic plate sequentially through an appropriate colour filter to the light transmitted from the original as the result of the application thereto of said scanning spot, utilising light transmitted from the original to modify the intensity of the scanning spot to compensate for colour or colour and tone imperfections of the reproducing process, and developing said plate to produce a colour separation negative.

In order that the invention may be clearly understood, some embodiments thereof will now be described, by way of example, with reference to the accompanying diagrammatic drawings, in which:

Fig. 1 is a schematic illustration of some embodiments of the invention,

Fig. 2 is a diagrammatic illustration of an original scanning device,

Figure 3A:
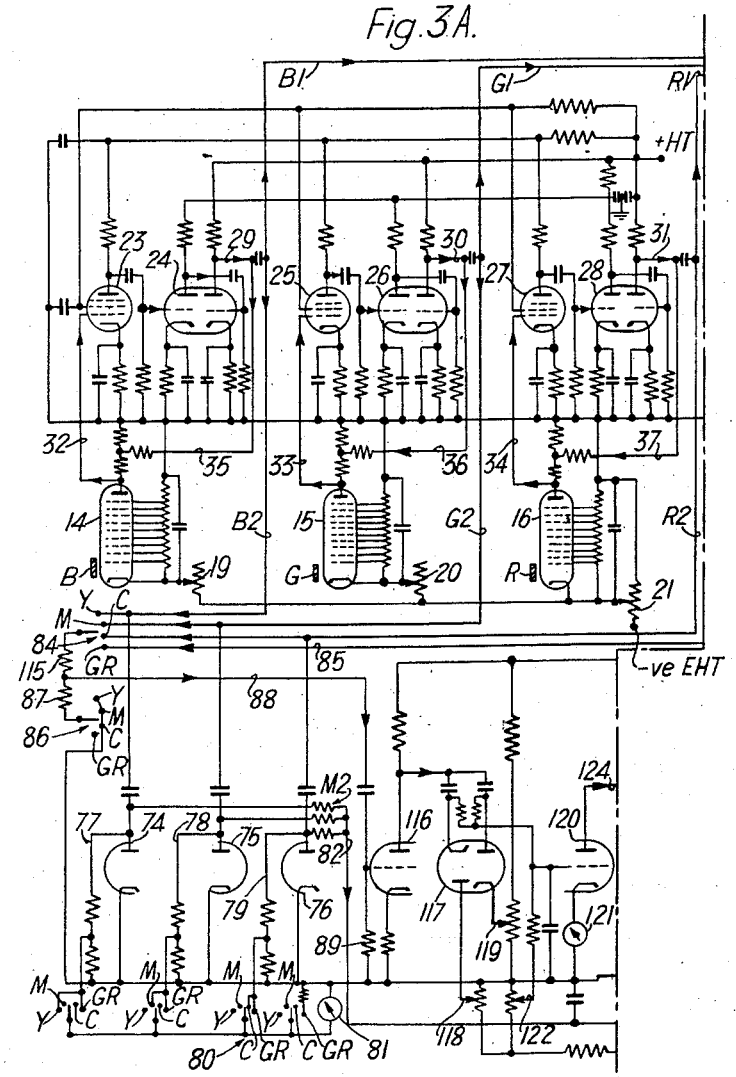
Figure 4:
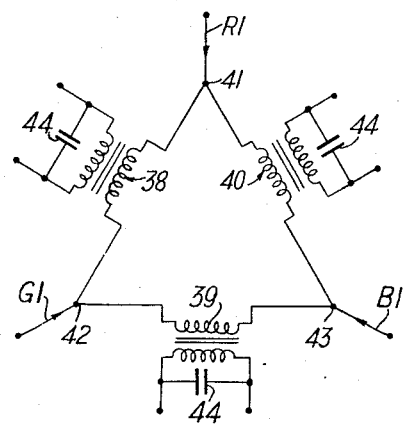
Figure 5:
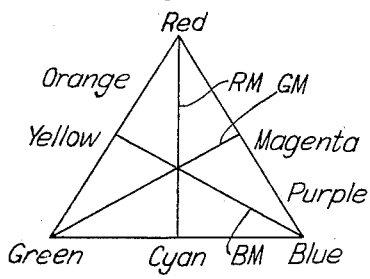
Figure 12:
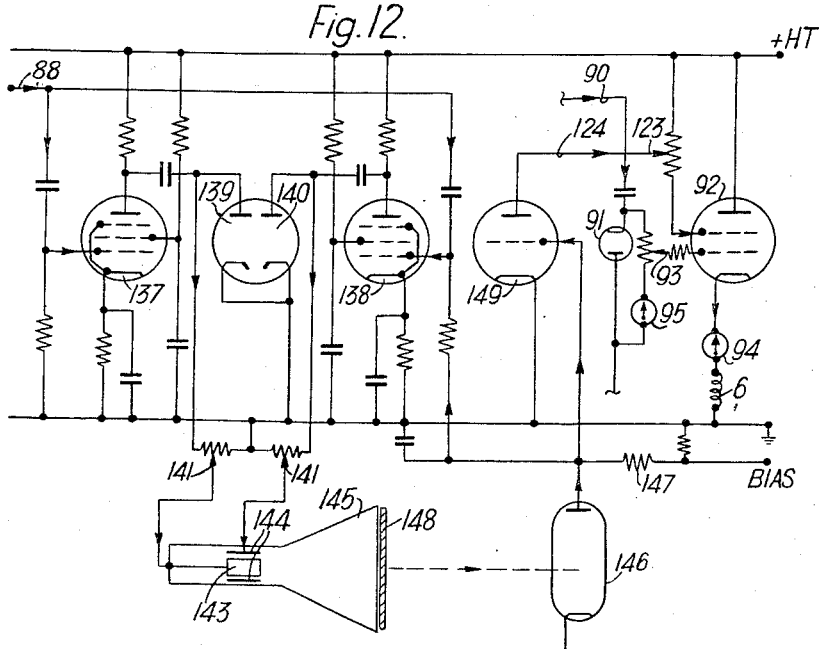

Figs. 3A and 3B are together a circuit diagram of electronic apparatus for controlling modification of the intensity of a scanning spot of light, Fig. 4 illustrates the delta connection of transformers embodied in the circuit of Fig. 3B, Fig. 5 is a colour triangle, Fig. 6 is a graph illustrative of the output of part of the electronic apparatus as compared with the form of a light density modulating control signal, Fig. 7 is a graph illustrative of the reproduction curve of a printing plate, Fig. 8 is a graph illustrative of the action of a tone correcting device used to improve the reproduction curve of a printing plate, Fig. 9 is a diagrammatic illustration of a part of a modified form of original scanning device, Fig. 10 diagrammatically illustrates a scanning device for scanning transparent originals, Fig. 11 diagrammatically illustrates a modified form of the device illustrated in Fig. 10, Fig. 12 illustrates a circuit which can be substituted for a part of that shown in Figs. 3A and 3B, and Fig. 13 is a graphic illustration of the path of a light spot over the screen of a cathode ray tube embodied in Fig. 12.

Referring to Figs. 1, 2, 3A, 3B, and 4, a coloured original 1, which is opaque and which may consist of a water-colour, an oil colour, or a coloured print, is rigidly supported in any suitable manner, as for example by a rigid frame extending upwards from a base plate or the like, not shown, on which is also mounted a camera 2. In one embodiment of the apparatus the original 1 is placed and secured in position behind a thin sheet of glass 3, Fig. 2.

The original is to be sequentially scanned by a small spot of substantially white light directed on to the original by any suitable source such as an electric lamp of suitable intensity, or by a gas-filled arc discharge lamp of suitable spectral composition and which is capable of intensity modulation. In Fig. 2 the light source is assumed to be an electric lamp 4 co-acting with an optical system comprising a condensing lens 5, an intensity modulator 6, and a projection lens 7 to focus on the original the small scanning spot of light. The modulator 6 may be a mirror galvanometer, a light valve such as a double ribbon galvanometer, or a vibrating diaphragm, operation of which is controlled, as described below, to vary the intensity of the small spot of light applied to the original.

The lamp and optical system are contained in a housing 8 which is supported from the base plate by any suitable means, not shown, and provided with any suitable mechanism, also not shown, by which the housing is moved relative to the original 1 in both horizontal and vertical directions to cause the light spot to effect sequential scanning of the original. The operation of the shutter of the camera 2 is synchronised with the movement of the scanning spot of light so that the shutter opens at the beginning of a scanning sequence and closes at the end of the sequence when the original has been scanned. In one construction the housing 8 carries a small freely rotatable wheel 9 which runs on the surface of the glass 3 so as to keep the spot of light accurately focussed on the original 1.

Light which is transmitted by reflection from the original may be received by a lens different from lens 7 for direction thereby to a photo-electric device described below or, as shown in Fig. 2, the lens 7 may be used to direct the light reflected from the original on to a semi-silvered mirror 10 and thence to a chopper disc 11 which is oscillated, or rotated, in any suitable manner, not shown. The disc 11 operates to interrupt the reflected light rays before they pass through the aperture 12 of a container 13 fitted in the housing 8 and containing three photo-electric devices 14, 15, and 16, shown in Fig. 3A as photo-multiplier cells, fitted respectively with a blue filter B, a green filter G, and a red filter R. It will be understood that, if desired, the photo-electric devices may be other than photo-multiplier cells, for example they may be photo-transistors. The light rays passing through aperture 12 are split by beam-splitting reflectors 17 and 18 by which each ray is split into three parts before being focussed on the cathodes of the cells 14, 15, 16. Variable resistances 19, 20, 21, Fig. 3A, are connected for initial adjustment of the negative EHT voltage on the photo-multiplier cell cathodes and are used to effect pre-setting of the analyser, described below, to obtain an initial condition of balance thereof.

The sheet of glass 3, due to refraction, to some extent, impairs the focus of the light spot on the original and a correcting element, not shown, is preferably incorporated in the projection lens 7.

Primary colour signals from cells 14, 15, 16 each representative of a primary colour component of light transmitted from the original a.e transmitted to an electronic control means 22, Fig. 1, which means is illustrated in detail in Figs. 3A and 3B. The signals from cells 14, 15, 16 are respectively amplified by three-stage amplifiers, 23, 24; 25, 26; and 27, 28, Fig. 3A, and as the amplified signals are to be matched against each other by a colour analysing device, as described below, it is required that the primary colour signals be amplified without distortion. To assist in achieving this end the amplifiers use negative feed-back which is applied from the output connections 29, 30, 31, Fig. 3A, back to the photo-cell output lines 32, 33, 34, along lines 35, 36, 37.

The amplified primary colour signal outputs pass along lines B1, G1, and R1 to a colour analysing device which includes three transformers 38, 39 and 40, Figures 3B and 4, the primary windings of which are delta connected. The primary colour signals are matched against each other in the primary windings to eliminate from the primary colour signals components thereof representative of tones of grey in the original. The signals induced in the secondary windings of the transformers are dependent on the relative amplitudes of the primary colour signals applied to the primary windings and these latter signals depend on the hue and density saturation of colour of the original. To separate the signals corresponding to the colour components the signals are passed through discriminating means including amplifier and phase discriminating circuits, described below.

As stated above the primary colour signals on lines B1, G1, and R1 are applied to the primary windings of the transformers 38, 39, 40 and when the amplitude of the signals at points 41, 42, 43, Figs. 3B and 4, are equal, as occurs when the scanning spot is traversing a grey area of the original, the signals in the primary windings will be balanced and no currents will flow in the transformer primary windings. However, any departure from a neutral colour, that is from the grey scale, will result in a difference of amplitude between the signals along lines B1, G1, and R1 and the voltage differences between the points 41, 42, and 43 will cause currents to flow between these points in the transformer primary windings and so give rise to signals in the transformer secondary windings.

The primary colour signals on lines B1, G1 and R1 are representative both of the spectral colours, and of the tones of grey of the original and the components representative of tones of grey are balanced out in the primary windings. The signals induced in the secondary windings are only representative of the spectral colours of the original.

For example, the transformer 38 will give an output signal of one phase when the amplitude of the signal on line R1 exceeds that on line G1, and also a signal in the opposite phase when the amplitude of the signal on line G1 exceeds that on R1. Transformer 39 will give an output signal in one phase when the amplitude of the signal on line G1 exceeds that on line B1 and a signal in the opposite phase when the amplitude of the signal on line B1 exceeds that on line G1. Transformer 40 will give an output signal in one phase when the amplitude of the signal on line R1 exceeds that on B1 and a signal in the opposite phase when the amplitude of the signal on line B1 exceeds that on R1.

The secondary windings of the transformers are shunted by condensers 44 to tune them to the carrier frequency generated by the light chopper 11, Fig. 2, thereby to increase the sensitivity of the circuits to signals at the carrier frequency and so increase the signal-to-noise ratio.

An analysis of the predominant signals induced in the secondary windings of the transformers 38, 39, and 40 will now be given with reference to Fig. 5. The signals developed in the transformer secondaries will be referred to as "in phase" if they are induced by voltage differences between points 41 and 42, between points 42 and 43, or between points 43 and 41 when the signal voltage at the first named point is greater than that at the second-named point. The signals developed in the transformer secondaries will be referred to as "anti-phase" when the signal voltage at the first named point is less than that at the second named point.

Referring to Fig. 5 it will be seen that blue, green, and red are the primary colours none of which contains any component of the other two. Purple and magenta each contain components of red and blue; orange and yellow each contain components of red and green; and cyan contains components of blue and green.

The filters B, G, R, Figs. 1, 2 and 3A, are each effective to transmit a continuous range of light frequencies which forms a third of the total range of frequencies present in the spectrum of white light. Thus the filter B will transmit cyan, which has a green component, and purple and magenta which each have a red component. The filter R will transmit orange and yellow which each have a green component, and purple and magenta which each have a blue component. The filter G will transmit cyan, which has a blue component, and orange and yellow each of which has a red component. None of the filters B, G, R will transmit light of a colour which lies at the opposite ends of the medians BM, GM, RM, Fig. 5, that is filter B will not transmit yellow; filter G will not transmit magenta; and filter R will not transmit cyan.

Accordingly, the apparatus herein described can be used in the preparation of colour separation photographic negatives for the printing process colours yellow, cyan and magenta. When a colour separation plate is exposed in camera 2, using a blue filter with the camera, the yellow components of the original will not be transmitted by the filter so that, when the plate is developed, the clear parts of the negative correspond to the yellow components of the original and the plate can be used, in known manner, to prepare a plate for printing with yellow process ink. Similarly, when the exposure is made through red or green filters used with the camera there can be produced plates for printing with cyan or magenta process inks respectively.

From the foregoing it will be understood that a primary colour signal on line B1 is indicative of the presence in the light response from the original of colours varying from cyan through blue to purple and magenta. Similarly a primary colour signal on line G1 indicates the presence of colours ranging from cyan through green to yellow; and a signal on line R1 indicates the presence of colours ranging from yellow through orange and red to magenta and purple. The amplitudes of these primary colour signals will have been corrected by the initial adjustment of the variable resistances 19, 20, and 21 to allow for the background tones of the paper on which printing is to be effected.

Accordingly, if, for example, the light response from the original contains purple or magenta and the response from the magenta in the original results in primary colour signals of substantially equal amplitude on each of lines B1 and R1, but no primary colour signal on G1, signals will be induced in the secondaries of transformers 38, 39, and 40, the signal in transformer 38 being an "in phase" signal; and the signal in transformer 39 being an "anti-phase" signal. An "in-phase" signal in transformer 40 will indicate the presence of purple, and an "anti-phase" signal the presence of colours between red and magenta. Magenta consists of red and blue in equal quantities, and as such will induce no signal in the secondary of transformer 40. The range and nature of the signal produced by the transformers is shown in the following table:

| Transformer | In-Phase Signal Produced By— | Anti-Phase Signal Produced By— |
| --- | --- | --- |
| 38 | Purple, Magenta, Red, Orange. | Green, Cyan. |
| 39 | Green, Yellow, Orange | Magenta, Blue, Purple. |
| 40 | Blue, Purple, Cyan | Red, Yellow, Orange. |

Referring to Fig. 3B, the discriminating means includes a phase-discriminating valve 45 having its cathode connected to one end of the primary winding of a transformer 55, the other end of which is connected to the secondary winding of transformer 38; a phase-discriminating valve 46 having its cathode connected to the secondary of transformer 39; and a phase-discriminating valve 47 having its cathode connected to the secondary of transformer 40, and for each phase-discriminating valve a load resistance 48 across which the colour signals from the transformers are developed. The valves 45, 46, 47 act as rectifiers and pass only the negative half-cycles of the signals from the transformers 38, 39 and 40. The control grids of valves 45, 46, and 47 are connected to line 49 to which gating signals are applied to ensure that the valves are capable of conducting only during the desired half cycles, the arrangement being such that when the negative phase of the "anti-phase" colour signal coincides with the conducting state of a valve a signal will be developed across the load 48, but when the colour signal is "in-phase" the valve will be blocked and no signal will be developed across the load.

The gating signal is obtained from a gating signal producing means which is connected to a mixing circuit (referred to in the appended claims as "a first mixing circuit") M1 which mixes the primary colour signals on lines B1, G1, and R1. The gating signal producing means includes the valves 50 and 52 and their associated circuitry. The output from the first mixing circuit M1 is applied to the grid of a valve 50 the anode of which is connected to a transformer 51 thereby to amplify the gating signal applied to line 49, and the positive half-cycles are removed by a valve 52 having its anode connected to the secondary of transformer 51 and its grid connected to line 49. It will be understood that, if desired, the phase of the gating signal can be altered by reversing the connections of the transformer 51 so that the "in-phase" or "anti-phase" signals can be utilised as desired.

To increase the versatility of the apparatus circuits combinations of "in-phase" and "anti-phase" signals may be used to provide an increased response to some colours or cancellation of an unwanted colour response, and to this end three selector circuits are provided each connecting the secondary windings of one of the transformers 38, 39, 40 with the output from another of the transformers to control the transmission of suppression of output signals from the phase-discriminating valves 45, 46, 47. Thus when preparing a colour separation plate for use in the preparation of a printing plate for a yellow printer the main colour signals blue, purple and magenta are derived, as shown in the table given above, from the "anti-phase" signals of transformer 39. It is, however, desirable to have a small response to red and this is obtained from the "anti-phase" signal in the secondary of transformer 40 by connecting the secondary of the transformer 40 through a variable resistance 53 and a line 54 to the cathode of the phase-discriminating valve 46 thus giving "anti-phase" red, orange, and yellow signals of which the unwanted yellow and orange signals are cancelled by the "in-phase" yellow and orange signals induced in the secondary winding of transformer 39. The "in-phase" green signal from transformer 39 and the "in-phase" blue, purple and cyan signals from transformer 40 will not pass the phase-discriminating valve 46.

In preparing a colour separation plate for a magenta printer the main colour signals green and cyan are the "anti-phase" signals in the secondary of transformer 38 but a signal for blue may also be required and can be injected into the signal from the transformer 38 by a transformer 55 which is connected to the output from transformer 38 and through a potentiometer 56, line 57 and the phase-discriminating valve 46 to the secondary winding of the transformer 39. As can be seen from Fig. 3B, a blue signal is taken from the "anti-phase" signal in transformer 39 after phase discrimination because if it were taken directly from transformer 39 it would contain an "in-phase" component of green which would act to cancel the green signal from transformer 39. The "anti-phase" magenta and purple signals fed into the magenta printer signal by transformer 55 will be cancelled by the "in-phase" magenta and purple signals induced in the secondary winding of transformer 38.

In preparing a colour separation plate for use in the preparation of a printing plate for a cyan printer the main colour signals red, orange and yellow, are derived from the "anti-phase" signals from transformer 40 which are representative of red, orange, and yellow. However, when a yellowish-green area of the original is scanned, an "anti-phase" red signal will be produced in the secondary winding of transformer 40, corresponding to the red component of the original colour. This unwanted signal is cancelled by the "in phase" red signal which is developed in the secondary winding of transformer 38 and fed to the output of transformer 40 on line 58. The "in-phase" purple, magenta, and orange signals which are also fed on line 58 will not pass the phase-discriminating valve 47.

In preparing a photographic plate for use in producing a printing plate for a black printer, that is a printing plate carrying all shades from white to black, no filter is used with the camera but the proportions of the three primary colour components recorded on the photographic plate are a function of the spectral sensitivity of the photographic plate and the correcting signals required will depend on this factor and on the nature of the colours of the printing inks to be employed. The proportions of the colour signals used in this instance are controlled by the three potentiometers 59, 60, 61 connected in the anode output lines 62, 63, 64 of amplifiers 65, 66, 67 respectively receiving the phase-discriminated outputs from valves 46, 45, and 47. The amplifier outputs on lines 62, 63, 64 are process colour signals for use respectively in the preparation of colour separation printing plates for the yellow, magenta and cyan printers. The potentiometers are connected to a common line 68, on which the process colour signal for the black printer is developed, and which is connected to a first four-position, manually operable switch 69 the function of which is described below, as is the purpose of a second four-position switch 70 to which are connected the output lines 62, 63, 64.

From the foregoing it will be understood that the process colour signals obtained in the manner described above can be controlled within relatively wide limits to give the required colour response. In general, however, the colour signals so obtained as the result of the variations of light response from the original due to variations of the colour density scale of the original will not provide a signal suitable to effect the required modulation of intensity of the scanning spot. This is illustrated by Fig. 6, which shows a considerable difference between the graph CD of the strength of the process colour signals transmitted along lines 62, 63, and 64, and the graph CC of the signals which are required to effect the colour correction, by controlling the operation of the modulating device 6, Fig. 2; both graphs being plotted against the colour density of the original.

To conform the process colour signals more closely to that required the output lines 62, 63, 64 are connected to correction means which includes the first and second switches 69 and 70 which are simultaneously operable, presettable, four-position switches and which are movable simultaneously by operation of a single control knob, not shown. The movable contacts of the switches 69 and 70 are connected by a line 71 to the grid of a variable mu pentode amplifier 72 to transmit a process colour signal thereto. The pentode amplifier 72 forms with a second variable mu pentode amplifier 73 a two-stage amplifier which is a part of the correction means. In order that the amplification may be varied according to the density of the original the bias on amplifiers 72, 73 can be varied by a signal whose strength is proportional to all the primary colour signals and which is produced by the first mixing circuit M1. The signals from lines B2, G2, and R2 are respectively passed to the anodes of density detectors 74, 75, 76 and the detected signals are also passed via lines 77, 78, 79 and a switch 80 to a meter 81 which registers the density of the original. The outputs from density detectors 74, 75 and 76 are mixed by a mixing circuit M2 (referred to in the appended claims as a second mixing circuit) and are transmitted along a line 82 to vary the bias on the control grids of amplifiers 72, 73 via a bias controlling potentiometer 83, Fig. 3B, by which, if necessary, the bias signals can be proportionately varied to cause the output signal from the amplifiers 72, 73 to conform to the desired conditions according to the kind of colour separation being effected, as shown by the correction curve CC in Fig. 6. When switch 84, referred to in the appended claims as a "fourth switch," is set to co-operate with line 85 a further switch 86, also operable with switches 69, 70, cuts out the connection of resistor 87 to earth and the signal on line 85 from the first mixing circuit M1 passes to line 88 and is developed across resistor 89.

The colour correction signal from amplifier 73 is transmitted via line 90, Fig. 3B, to a first rectifier valve 91 the output from which passes to a modulator valve 92 the output from which controls the operation of the intensity modulator 6, Figs. 2, 3B and 13. The amount of colour response correction can be adjusted by manipulation of a colour correction signal modifying potentiometer 93 and an indication of the effective light is obtained from a meter 94. A further meter 95 gives an indication of the strength of the colour response correction signal and facilitates the adjustment of the amount of the signal fed to the grid of the modulator valve 92 by the potentiometer 93.

Control of the grey scale is effected by a grey-scale correction circuit including a rectifier circuit, during preparation of a colour separation plate, the control being effected by a combination of a colour correction signal derived from the process colour signals on lines 62, 63, 64 by a mixing circuit M3, Fig. 3B (referred to in the appended claims as "a third mixing circuit") and a signal derived from the first mixing circuit M1. The signal from the mixing circuit M3 is transmitted along line 96 to the grid of a variable mu pentode amplitude correcting valve 97, which is biased by the potential on line 82, thence through a potentiometer 98 to a rectifier 99, the negative-going component being developed across a resistance 100. A signal obtained from the mixing circuit M1 is fed to valve 50 and is transmitted along line 101 via a potentiometer 102 (referred to in the appended claims as "a second potentiometer") and line 103 to the anode of a second rectifier 104 the negative-going output from which is developed across a resistance 105. The composite negative-going signal developed across the resistor chain 100, 105, 106 is then fed to the control grid of a grey-scale signal inverter 107 controlled by a switch 108 (movable with switches 69, 70 and referred to in the appended claims as "a third switch") which renders the grey-scale signal inverter active during preparation of a colour separation plate for the printing process colours yellow, magenta and cyan but cuts it out during preparation of a photographic plate for use in preparing a printing plate for a black printer. During the preparation of a colour separation plate, with the grey-scale signal inverter 107 switched "in," the output from rectifier 104 is also applied to the grid of the grey-scale signal inverter 107 and the resultant output developed in the cathode circuit is a grey-scale signal which is at a maximum for black and is zero for white and all saturated colours. The grid bias on the modulator valve 92 can be varied by varying the potentiometer 109 which is connected to a source of bias voltage. The grey-scale signal transmitted by the grey-scale signal inverter 107 can be adjusted by manipulation of a third potentiometer 110, a meter 111 being provided in the cathode circuit to facilitate the adjustment.

The grey-scale signal transmitted through a potentiometer 110 passes to the colour correction signal modifying potentiometer 93, where it modifies the colour correction signal, and the modified signal passes to the control grid of modulator valve 92 to control the operation of the intensity modulator 6.

The part of the correction means thus far described controls the modulator 6 only to effect intensity modulation as required for colour response correction. It is, however, also desired to provide facilities for effecting a correction to overcome or reduce tone distortion which, as is illustrated in Fig. 7, is inherent in many reproduction processes. In Fig. 7 the deficiencies in the reproduction processes are represented by the variations of the curved line 112. A tone correction circuit, about to be described, is provided to produce a tone correction signal which is represented in Fig. 7 by the dotted curve 113 and the effect of which is to counteract curve 112 and so produce a reproduction line approximating that of the optimum line 114.

Referring to Fig. 3A, the switch 86 co-operates with resistors 115 and 87 to equalise signals which are switched through switch 84. Thus when switch 84 is connected to line 85 there is a voltage drop due to the mixing circuit M1, and when the switch 84 is connected to one of the lines B2, G2, R2 primary colour signals from the photocell amplifier outputs are divided between the resistors 115 and 87, the resistor 87 being then connected to earth by the switch 86, thereby to give an equivalent voltage drop. The signals transmitted along line 88 are applied to the grid of an amplifier 116 the output from which is applied to a pair of diodes 117 connected in opposition to each other and having different bias potentials controlled by bias controlling potentiometers 118, 119 so that they come into operation at different signal levels to provide that the anode current of an amplifying buffer valve 120 varies, as will be indicated on a meter 121, according to the density of the original as is illustrated in Fig. 8 in which Ia and Va are respectively the anode current and the voltage values applied to the anode of valve 120. Thus, from Fig. 8, it will be seen that, the valve 120 being normally biased to "cut-off" by a biasing potentiometer 122, as the anode current varies the anode voltage varies conversely.

The screen grid of modulator valve 92 is connected, through a tone signal control potentiometer 123 and line 124 with the anode of valve 120 thereby providing a tone correction signal which by controlling the operation of the modulating element 6 results in a correction of light response from the original to permit the production of a photographic negative from which can be produced a printing plate the reproduction curve of which corresponds closely to the optimum straight line 114, Fig. 7.

The signal developed in the cathode circuit of the modulator valve 92, which includes the intensity modulator 6, is therefore the required modulating signal.

When preparing the apparatus for operation, the switch 70, Fig. 3B, is turned to the GR position which is the "grey" position thereof the switches 69, 84, 80, 86 and 108 thereby also being simultaneously set at the GR positions thereof. A sample of the white paper on which printing with the yellow, cyan, and magenta process is later to be effected is then positioned before the scanning device and a scanning spot is directed on to it so that the light response therefrom is passed to the photo-electric cells 14, 15, 16. The primary colours signals transmitted from the cells represent the basic colour components of the white paper which, however, may be a shade of off-white such as cream. To pre-set the apparatus according to the colours of the printing paper the cell circuits are balanced by adjustment of the variable resistances 19, 20, 21 to give a full-scale deflection, that is zero density, of the meter 81, Fig. 3A. The variable resistances 19, 20 are now adjusted to give a zero reading on the meter 95 Fig. 3B. The cells 14, 15, and 16 have now been balanced for sensitivity and give equal primary colour signals from the sample paper.

The switch 85 is next turned to the Y, M, or C position thereof according to the kind of colour separation negative to be prepared and the scanning spot of light is directed on to an area of the process colour, yellow, magneta, or cyan in respect of which it is required that the apparatus shall effect corrections. The colour correction modifying potentiometer 93 is now adjusted until the meter 81 again registers zero density so that the light response from the coloured area is the same as that from the white surface of the sample paper. The tone signal control potentiometer is adjusted until the meter 81 indicates that the desired setting for tone control is obtained according to selected tone values in the original to be reproduced. The apparatus is now conditioned to effect preparation of corrected colour separation negatives for three-colour printing and, as described above, each of the three colour separation photographic plates is placed in turn in the camera and is sequentially exposed during the sequential scanning of the original, the appropriate filters being used with the camera and provision made for filter factors by adjustment of the camera lens stop.

When the apparatus is being conditioned for four-colour work, the third potentiometer 110 is also adjusted until the meter 81 gives the desired reading while the scanning spot is directed on to a selected part of the grey scale of the original to be reproduced.

As will be understood a black or grey area on an original will give primary colour signals from each of the cells 14, 15, 16, in which event when this area is being reproduced by the printing machine, the reproduction will be effected by the superposing of yellow, cyan, magenta ink and, if four-colour printing is being effected, by the superposing of black ink on the yellow, cyan and magenta. This latter instance represents an undesirable printing condition because a better result will be obtained by the reduction of the colour components used and allowing the black printer to provide the bulk of the contribution to the printing of the black area. Adjustment of the third potentiometer 110 permits the apparatus to be so conditioned that the percentage of colour components can be reduced or increased relative to the grey scale.

It will be understood that to obtain optimum results from the apparatus it will be conditioned, as described above, for each plate to be prepared.

Fig. 9 illustrates a modified form of scanning head which can be employed with apparatus according to the invention when the original to be scanned is a "transparency" that is one through which light will pass. In this embodiment the lamp 4 is contained in an auxiliary housing 125 movable with a housing 8 containing a mirror 10, chopper disc 11, container 13, photo-electric devices 14, 15, 16, and filters B, G, R as described above with reference to Fig. 2. The transparent original is clamped between a sheet of glass 3 and a second sheet 126 and the housings 8 and 125 are disposed on opposite sides of the transparent original. The lamp 4 co-acts with an optical system including condensing lens 5 intensity modulator 6, projection lens 7, an auxiliary lens 127, and reflecting mirrors 128, 129 which split the beam and direct it respectively to the lenses 7 and 127. The disposition of lenses 7 and 127 is such that the light spot focussed by auxiliary lens 127 is slightly in advance of that focussed by lens 7 and the spot focussed by lens 7 is a light response-corrected spot which is directed on to the photographic plate in the camera but is masked from the cells 14, 15, and 16 at the aperture 12, Fig. 2. It will be understood that, if desired, the auxiliary lens 127 may be associated with a light separate from the lamp 4 and with no intensity modulator so that the scanning spot from lens 127 is of fixed intensity and is employed solely as a pilot spot for the purpose of initiating control of an intensity modulator associated only with lens 7.

It will also be understood that, if desired, a modified arrangement of lenses 7 and 127 can be employed to effect scanning of "reflection" originals as described above with reference to Fig. 2.

With mechanically operated scanning devices as described above there is a limit imposed on the rate of scanning according to the quantity of light required properly to expose a photographic plate in the camera. Accordingly, if desired, provision may be made to increase the size of the scanning spot and the rate of scanning proportionately to the size of an original to be scanned so that all sizes of original within a given range of sizes may be scanned within the same interval of time while ensuring proper exposure of the photographic plate in the camera.

Fig. 10 illustrates a scanning device for scanning transparent originals of the kind known in the art as "pure dye image transparencies," this being a transparency which is non-light scattering, that is a ray of light which is normally incident on one side of the transparency will pass through it without any appreciable change of direction. This form of scanning device comprises a cathode ray tube 130 and the transparent original is placed flat against the screen of the tube, to be photographed by a camera 2 provided with an aperture which is sufficiently small as to give no appreciable increase of the effective spot size due to the original being separated from the scanning spot by the thickness of the cathode ray tube screen, that is to say the camera lens system is stopped down to allow only that part of the light beam which has not undergone any substantial refraction by the screen to affect the emulsion of the photographic plate. A light-chopper disc, not shown, is provided in the lens system 132 to interrupt periodically the light which falls on the photo-cells 14, 15 and 16. Some of the light transmitted from the original is deflected to the cells 14, 15, and 16 by a reflector 131 and is picked up by a lens system 132 having a stop 133 which also has only a small aperture for the reasons just stated.

The spot of light on the screen of the cathode ray tube 130, is, in known manner, made to form a raster by the action of two time bases, and the intensity of the scanning spot is modulated by applying to the grid 134 of the tube 130 the modulating signal transmitted from the modulator valve 92, Fig. 3B.

Fig. 11 illustrates a scanning device which is a modified form of that described with reference to Fig. 10 and which is arranged to scan a transparent original of the kind which tends to be light-scattering or which consists, in known manner, of a pure dye image transparency combined with a silver mask. In this embodiment of the scanning device the cathode ray tube raster is projected by a lens 135 on to a diffusing screen 136, the transparent original 1 being positioned in contact with the diffusing screen as illustrated in Fig. 11. With this arrangement there is some loss of light in transmission through the diffusing screen thus necessitating longer exposure of the photographic plate in the camera but it is not necessary to stop down the camera aperture or to provide a stop 133 because the light spot can be focussed on to the diffusing screen 136 by lens 135.

Fig. 12 illustrates an alternative tone control circuit in which signals transmitted along line 88, Figs. 3A and 12, are applied through pentode amplifiers 137, 138, tone correction detectors 139, 140, and potentiometers 141, 142 to the X-plates 143 and to the Y-plates 144 respectively of a tone correction cathode ray tube 145. Under normal working conditions the spot of light on the screen of the tube 145 will trace a line across the screen of the tube and the light is directed on to a photo-multiplier cell 146 connected through load resistance 147 with a control inverter 149 which controls the screen potential of the modulator valve 92.

The potential developed by the cell 146 is also used to bias the amplifier 138, which is a variable mu pentode amplifier, thus tending to maintain constant the output of this amplifier irrespective of variations of signal transmitted along line 88. The amplifier 137, however, gives an output proportional to the input thereto. The combined action of amplifiers 137, 138 is to move the spot of light across the face of the tube 145 in a horizontal direction, the position in that direction being dependent only on the density of the original, and to move the spot vertically due to the increase of intensity of the scanning spot which scans the original.

An opaque template 148, Figs. 12 and 13, is placed against the screen of tube 145 and is provided with a profile 150, Fig. 13, which represents the response from the circuit, which response is required to counteract the distortion usual in the reproduction process for which the photographic plate is required.

Due to the action of cell 146 and inverter 149 the spot scanning the original will increase in intensity until the spot of tube 145 reaches the edge 150 of template 148 and as it passes the edge 150 the light is cut-off from cell 146 thus making the grid voltage of inverter 149 less negative and effecting a lowering of the screen potential of modulator valve 92 and so reducing the intensity of the spot scanning the original. This, in turn, prevents the spot of tube 145 moving up the screen of the tube so that a position of balance is obtained with the tube spot located on the edge 150 of the template. By this arrangement the tone correction signal can be controlled to suit any kind of reproduction process, or original, by the selection and use of suitably constructed templates 148.

Fig. 13 is a graphic illustration of the normal path of the spot of tube 145 as represented by the dotted line 151 and the balanced path thereof as determined by the edge 150 of a template 148.

It will be understood that if, as mentioned above, a gas discharge lamp is used as the light source for the light spot which scans the original no external modulating element will be required as modulation can be effected by applying the modulating signal to an electrode of the lamp.

I claim:
1. Apparatus for the preparation of a colour separation photographic negative for use in photo-mechanical reproduction processes, comprising scanning means arranged to produce a spot of substantially white light and so to direct the spot onto a coloured original as to effect sequential scanning of the original, three photo-electric devices respectively having associated therewith a blue, a green, and a red filter, said photo-electric devices being disposed to be responsive to light transmitted from the original through the filters to produce electrical primary colour signals representative of the primary colour components of light transmitted from the original, three variable resistances connected one each in the cathode circuits of the photo-electric devices to obtain an initial condition of balance of the devices, three transformers the primary windings of which are delta connected to the photo-electric devices to receive said primary colour signals, to eliminate therefrom components representative of tones of grey in the original and to produce in their secondary windings signals representative only of the spectral colours of the original, a phase-discriminating valve for each transformer each said phase-discriminating valve having its cathode connected to the secondary winding of the transformer appropriate thereto, a first mixing circuit connected to the photo-electric devices and operable to effect mixing of said primary colour signals, gating signal producing means connected to said first mixing circuit and to the control grids of the phase-discriminating valves and operable to produce a gating signal for transmission to the phase discriminating valves to permit conduction of said phase-discriminating valves only during predetermined phases of said secondary winding signals corresponding to the required signal components, three selector circuits each connecting the secondary winding of one transformer with the output from another of the transformers to control the transmission or suppression of components of said secondary winding signals, and correction means connected to the photo-electric devices to receive said primary colour signals and to the phase-discriminating valves to receive a process colour signal from one of said phase-discriminating valves, and operable under control of said one process colour signal and of said primary colour signals from which the components representative of gray tones have been eliminated to produce therefrom a modulating signal for application to the scanning means to modulate the intensity of the scanning spot.

2. Apparatus for the preparation of a colour separation photographic negative for use in photo-mechanical reproduction processes, comprising scanning means arranged to produce a spot of substantially white light and so to direct the spot onto a coloured original as to effect sequential scanning of the original, three photo-electric devices respectively having associated therewith a blue, a green, and a red filter, said photo-electric devices being disposed to be responsive to light transmitted from the original through the filters to produce electrical primary colour signals representative of the primary colour components of light transmitted from the original, three transformers the primary windings of which are delta connected to the photo-electric devices to receive said primary colour signals, to eliminate therefrom components representative of tones of grey in the original and to produce in their secondary windings signals representative only of the spectral colours of the original, a phase-discriminating valve for each transformer each said phase-discriminating valve having its cathode connected to the secondary winding of the transformer appropriate thereto, a first mixing circuit connected to the photo-electric devices and operable to effect mixing of said primary colour signals, gating signal producing means connected to said first mixing circuit and to the control grids of the phase-discriminating valves and operable to produce a gating signal for transmission to the phase-discriminating valves to permit conduction of said phase-discriminating valves only during predetermined phases of said secondary winding signals corresponding to the required signal components, three selector circuits each connecting the secondary winding of one transformer with the output from another of the transformers to control the transmission or suppression of components of said secondary winding signals, and correction means connected to the photo-electric devices to receive said primary colour signals and to the phase-discriminating valves to receive a process colour signal from one of said phase-discriminating valves and operable under control of said one process colour signal from which the components representative of gray tones have been eliminated and of said primary colour signals to produce therefrom a modulating signal for application to the scanning means to modulate the intensity of the scanning spot.

3. Apparatus according to claim 2, wherein the correction means includes simultaneously operable, presettable, four-position switches of which a first switch determines the said one process colour signal to be received and has three active positions each appropriate to a process colour and an inactive grey position, said three active positions being connected one each to the outputs from the phase-discriminating valves.

4. Apparatus according to claim 3, including a second switch which has one active position only corresponding to the inactive grey position of the first switch, the outputs from the phase-discriminating valves being connected in common to said one active position of the second switch to produce a grey process colour signal.

5. Apparatus according to claim 4, including a potentiometer for each phase-discriminating valve disposed between the position of connection of the valve to said first switch and the said common connection to the one active position of the second switch.

6. Apparatus according to claim 5, including a two-stage amplifier the first stage of which is connected with each of said first and second switches, a modulator valve to transmit said modulating signal, a first rectifier the cathode of which is connected to the output of the second stage of the amplifier and to the modulator valve to apply to the modulator valve a colour correction signal, and a colour correction signal modifying potentiometer interposed between the rectifier and modulator valve to control adjustment of the signals transmitted to the modulator valve.

7. Apparatus according to claim 6, including three density detectors one for each of said photo-electric devices and connected each to the output of its photo-electric device, and a second mixing circuit connecting the detectors to the bias control of said two-stage amplifier to apply bias controlling signals thereto according to the density of an original scanned by the scanning means.

8. Apparatus according to claim 7, including a bias controlling potentiometer between said second mixing circuit and two-stage amplifier proportionately to vary the bias signals to the two-stage amplifier.

9. Apparatus according to claim 8, including a grey-scale correction circuit connected to said colour correction signal modifying potentiometer to apply a grey-scale signal thereto to modify the signal from said first rectifier.

10. Apparatus according to claim 9, including a third mixing circuit connecting the outputs from the phase-discriminating valves, and wherein the grey-scale correction circuit comprises a rectifier circuit controlled by said first and third mixing circuits, a grey-scale signal inverter, a third potentiometer connecting the grey-scale signal inverter to said colour correction signal modifying potentiometer, and a third four-position switch connected to the grey-scale signal inverter to control the rendering active or inactive thereof, said third switch being movable with said first switch and having three active positions and one inactive position corresponding to the active and inactive positions of the first switch.

11. Apparatus according to claim 10, wherein the rectifier circuit comprises a second rectifier, a second potentiometer connecting the second rectifier with said first mixing circuit, a third rectifier connected to the grid of the grey-scale signal inverter, an amplitude correcting valve connected to said second and third mixing circuits, and a fourth potentiometer connecting the amplitude correcting valve to the anode of the third rectifier.

12. Apparatus according to claim 11, including a pair of diodes connected in opposition, a fourth switch movable with said first switch selectively to connect the cathode and the anode of the first and second diodes respectively to the output from said first mixing circuit or to an output line from one of said photo-electric devices, signal level bias controlling potentiometers to provide different bias potentials to the diodes, an amplifying buffer valve the grid of which is connected to the output from the diodes and which is normally biased to the "cut-off" position by a biasing potentiometer, and a tone signal control potentiometer connected between said diodes and modulator valve to control the adjustment of tone correction signals from the diodes to the modulator valve.

13. Apparatus according to claim 12, including a tone correction cathode ray tube, a pair of amplifiers respectively to pass signals to the X and Y plates of the tone correction cathode ray tube, a fourth switch movable with said first switch selectively to connect the grids of the amplifiers to the output from said first mix or to an output line from one of said photo-electric devices, a pair of tone correction detectors connected in parallel between said amplifiers, potentiometers to control signals passed to said X and Y plates, a further photo-electric device to receive light transmitted by the raster of the tone correction cathode ray tube, an opaque template positioned against the screen of said tube to control exposure of the raster to said further photo-electric device, a feed-back circuit from the further photo-electric device to one of said amplifiers to apply bias thereto, and a control inverter to control the screen potential of the modulator valve.

14. Apparatus for the preparation of a colour separation photographic negative for use in photo-mechanical reproduction processes, comprising a scanning means including a projection lens arranged to direct an intensity corrected spot of substantially white light onto an original, means to move the lens relative to the original to effect sequential scanning of the original, an auxiliary lens movable with the projection lens and disposed to direct a pilot scanning spot of light onto the original slightly in advance of said intensity corrected scanning spot, three photo-electric devices respectively having associated therewith a blue, a green, and a red filter, and which are responsive to light transmitted by the original from the pilot scanning spot to produce electrical primary colour signals representative of the primary colour components of light transmitted from the original, and control means connecting the photo-electric devices to the scanning means, said control means including a colour analysing device arranged to eliminate from said primary colour signal components representative of tones of grey in the original and to produce process colour signals from components of said primary colour signals representative only of the spectral colours of the original, and correction means operable under control of one of said process colour signals from which the components representative of gray tones have been eliminated and of said primary colour signals to produce a modulating signal for application to the scanning means to modulate the intensity of the intensity corrected scanning spot.

References Cited in the file of this patent

UNITED STATES PATENTS

| | | |
|---|---|---|
| 2,270,749 | Ball | Jan. 20, 1942 |
| 2,367,335 | Coote | Jan. 16, 1945 |
| 2,413,706 | Gunderson | Jan. 7, 1947 |
| 2,565,399 | Simmon | Aug. 21, 1951 |
| 2,691,917 | Curry | Oct. 19, 1954 |
| 2,740,828 | Haynes | Apr. 3, 1956 |
| 2,757,571 | Loughren | Aug. 7, 1956 |

FOREIGN PATENTS

| | | |
|---|---|---|
| 1,088,349 | France | Sept. 8, 1954 |

OTHER REFERENCES

"Matrixing and Encoding Color for Telecasting," Taub et al., Electronics, vol. 28, No. 11; Nov. 1955, pages 140–145.